United States Patent
Katoh et al.

(10) Patent No.: US 8,828,285 B2
(45) Date of Patent: Sep. 9, 2014

(54) PARTICULATE PRODUCTION APPARATUS AND PARTICULATE PRODUCTION METHOD, AND TONER PREPARATION APPARATUS AND TONER PREPARATION METHOD

(75) Inventors: Kiyotada Katoh, Shizuoka (JP); Minoru Masuda, Shizuoka (JP); Yasutada Shitara, Shizuoka (JP); Yoshihiro Norikane, Kanagawa (JP); Satoshi Takahashi, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 168 days.

(21) Appl. No.: 13/560,060

(22) Filed: Jul. 27, 2012

(65) Prior Publication Data

US 2013/0069263 A1 Mar. 21, 2013

(30) Foreign Application Priority Data

Sep. 16, 2011 (JP) .................................. 2011-203177

(51) Int. Cl.
*G03G 9/08* (2006.01)

(52) U.S. Cl.
CPC ............ *G03G 9/0802* (2013.01); *G03G 9/0804* (2013.01); *G03G 9/0821* (2013.01)
USPC .................... 264/9; 264/5; 425/6; 430/137.1; 430/137.18

(58) Field of Classification Search
None
See application file for complete search history.

(56) References Cited

U.S. PATENT DOCUMENTS

| | | | |
|---|---|---|---|
| 4,154,379 A * | 5/1979 | Schermutzki | .................. 222/420 |
| 5,721,083 A | 2/1998 | Masuda et al. | |
| 6,406,826 B1 | 6/2002 | Suzuki et al. | |
| 7,522,857 B2 | 4/2009 | Hasegawa et al. | |
| 7,759,036 B2 | 7/2010 | Utsumi et al. | |
| 8,084,176 B2 | 12/2011 | Iwamoto et al. | |
| 2002/0155366 A1 | 10/2002 | Mochizuki et al. | |
| 2002/0160290 A1 | 10/2002 | Sugiura et al. | |
| 2003/0152857 A1 | 8/2003 | Sugiura et al. | |
| 2003/0186154 A1 | 10/2003 | Suzuki et al. | |
| 2003/0232266 A1 | 12/2003 | Sugiura et al. | |
| 2005/0064310 A1 | 3/2005 | Masuda et al. | |
| 2006/0051692 A1 | 3/2006 | Hasegawa et al. | |
| 2006/0068306 A1 | 3/2006 | Shu et al. | |
| 2006/0093943 A1 | 5/2006 | Shu et al. | |
| 2007/0275315 A1 | 11/2007 | Nagatomo et al. | |
| 2007/0281236 A1 | 12/2007 | Watanabe et al. | |
| 2007/0281237 A1 | 12/2007 | Iwamoto et al. | |
| 2008/0063971 A1 | 3/2008 | Watanabe et al. | |
| 2008/0118855 A1 | 5/2008 | Nakayama et al. | |
| 2008/0261131 A1 | 10/2008 | Nakayama et al. | |
| 2008/0286680 A1 | 11/2008 | Norikane et al. | |
| 2009/0117486 A1 | 5/2009 | Watanabe et al. | |

(Continued)

FOREIGN PATENT DOCUMENTS

| | | |
|---|---|---|
| JP | 2003-262976 | 9/2003 |
| JP | 2008-286947 | 11/2008 |

(Continued)

*Primary Examiner* — Mary F Theisen
(74) *Attorney, Agent, or Firm* — Oblon, Spivak, McClelland, Maier & Neustadt, L.L.P.

(57) ABSTRACT

A particulate production apparatus, including a droplet discharger to discharge a liquid including a particulate element which is solidified to become a particulate; and a pressure controller to feed the liquid including a particulate element to the droplet discharger at a pressure within a desired range.

8 Claims, 5 Drawing Sheets

(56) References Cited

U.S. PATENT DOCUMENTS

| | | |
|---|---|---|
| 2009/0123857 A1 | 5/2009 | Shu et al. |
| 2009/0170018 A1 | 7/2009 | Kuramoto et al. |
| 2009/0239170 A1 | 9/2009 | Honda et al. |
| 2009/0325100 A1 | 12/2009 | Watanabe et al. |
| 2010/0003613 A1 | 1/2010 | Honda et al. |
| 2010/0021209 A1 | 1/2010 | Watanabe et al. |
| 2010/0104970 A1* | 4/2010 | Norikane et al. ........ 430/137.14 |
| 2010/0227267 A1 | 9/2010 | Shitara et al. |
| 2011/0014565 A1 | 1/2011 | Norikane et al. |
| 2011/0305987 A1 | 12/2011 | Yohichiroh et al. |
| 2012/0070777 A1 | 3/2012 | Makabe et al. |
| 2012/0094231 A1 | 4/2012 | Norikane et al. |

FOREIGN PATENT DOCUMENTS

| | | |
|---|---|---|
| JP | 2009-143101 | 7/2009 |
| JP | 2011-098302 | 5/2011 |
| JP | 2011-212668 | 10/2011 |

* cited by examiner

BOTH SIDE FIXED END
N=4
L=λ

FIG. 6B

BOTH SIDE OPEN END
N=4
L=λ

FIG. 6C

ONE-SIDE FIXED END
N=5
L=5λ/4

PARTICULATE PRODUCTION APPARATUS AND PARTICULATE PRODUCTION METHOD, AND TONER PREPARATION APPARATUS AND TONER PREPARATION METHOD

CROSS-REFERENCE TO RELATED APPLICATIONS

This patent application is based on and claims priority pursuant to 35 U.S.C. §119 to Japanese Patent Application No. 2011-203177 filed on Sep. 16, 2011 in the Japanese Patent Office, the entire disclosure of which is hereby incorporated herein by reference.

FIELD OF THE INVENTION

The present invention relates to a particulate production apparatus and a particulate production method, particularly to a toner preparation apparatus and a toner preparation method producing a particulate toner.

BACKGROUND OF THE INVENTION

Particulate resins needing uniformity, such as a particulate toner for electrophotography, a particulate spacer, a colored particulate for electron paper and a particulate for pharmaceutical medicine bearer are used in various applications. As a method of preparing a uniform particulate, a method of inducing a reaction in a liquid to form a particulate resin having a uniform particle diameter such as a soap free polymerization method is known. The soap free polymerization method has advantages, e.g., a particulate resin having a small particle diameter can easily be prepared, the particulate resin has a sharp particle diameter distribution, and the particulate resin nearly has a spherical shape. However, the particulate resin is subjected to de-solvent in a solvent which is typically water in the soap free polymerization method, and the particulate resin is not efficiently prepared. Further, the soap free polymerization method needs a long time in its polymerization process, separates the particulate resin from the solvent after solidified, and needs to repeat washing and drying then. Therefore, the method has a problem of needing much time, water and energy.

In order to solve this problem, the present inventor disclosed a toner preparation method by spray granulation in Japanese published unexamined application No. 2008-286947.

Specifically, in a droplet spray unit spraying a toner component liquid as a toner material, a thin film on which plural nozzles are formed is oscillated by an electromechanical transformation element as an oscillator to periodically oscillate the thin film up and down. Thus, a pressure in a liquid chamber partially formed by the thin film is periodically changed to discharge a droplet from the nozzle in a gas-phase space below the nozzle. The discharged toner droplet naturally falls in the same direction in the gas-phase space to form a line of the toner droplet. The toner droplet discharged in the gas-phase space is transformed to be spherical by a difference in surface tension between the liquid phase of the toner composition and the gas phase, and then dried and solidified to form a toner.

Japanese Patent No. 3786034 discloses a method of reserving a toner material liquid at a head, discharging the liquid by a pressure pulse, and drying and solidifying the liquid to prepare a particulate toner.

However, when the pressure pulse is driven, a gas dissolved in the liquid reserved at the head generates a microscopic gas bubble causing a problem of defective discharge.

In order to solve this problem, a method of using a deaerator removing the gas dissolved in the liquid to prevent the gas bubble from generating is known.

Further, when the liquid pressure to the head is too high or too low, the liquid exudes from a discharge hole of the head or air mixes in, which causes problem of unstable discharge of the droplet.

In order to solve this problem, Japanese published unexamined application No. 2011-98302 discloses a method of locating a tank reserving a liquid fed to an inkjet head and a pressure sensor monitoring a pressure of the liquid in the tank, and discharging the liquid until the pressure sensor indicates a desired pressure to control the pressure to the head.

However, when continuously discharging droplets and consuming a large amount of the liquid as the toner preparation apparatus by the spray granulation method, the method disclosed in Japanese published unexamined application No. 2011-98302 discharges a large amount of the liquid to control the liquid pressure to the head, resulting in increase of environmental load and cost.

Because of these reasons, a need exist for an environmental load-reducing and low-cost particulate production method properly controlling the discharge pressure to stabilize discharging.

SUMMARY OF THE INVENTION

Accordingly, one object of the present invention to provide an environmental load-reducing and low-cost particulate production apparatus properly controlling the discharge pressure to stabilize discharging.

Another object of the present invention to provide an environmental load-reducing and low-cost particulate production method properly controlling the discharge pressure to stabilize discharging.

A further object of the present invention to provide an environmental load-reducing and low-cost toner preparation apparatus properly controlling the discharge pressure to stabilize discharging.

Another object of the present invention to provide an environmental load-reducing and low-cost toner preparation method properly controlling the discharge pressure to stabilize discharging.

These objects and other objects of the present invention, either individually or collectively, have been satisfied by the discovery of a particulate production apparatus, comprising:

a droplet discharger configured to discharge a liquid comprising a particulate element which is solidified to become a particulate; and a pressure controller configured to feed the liquid comprising a particulate element to the droplet discharger at a pressure within a desired range.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention provides an environmental load-reducing and low-cost particulate production apparatus properly controlling the discharge pressure to stabilize discharging.

More particularly, the present invention relates to a particulate production apparatus, comprising:

a droplet discharger configured to discharge a liquid comprising a particulate element which is solidified to become a particulate; and a pressure controller configured to feed the liquid comprising a particulate element to the droplet discharger at a pressure within a desired range.

Figure 1:
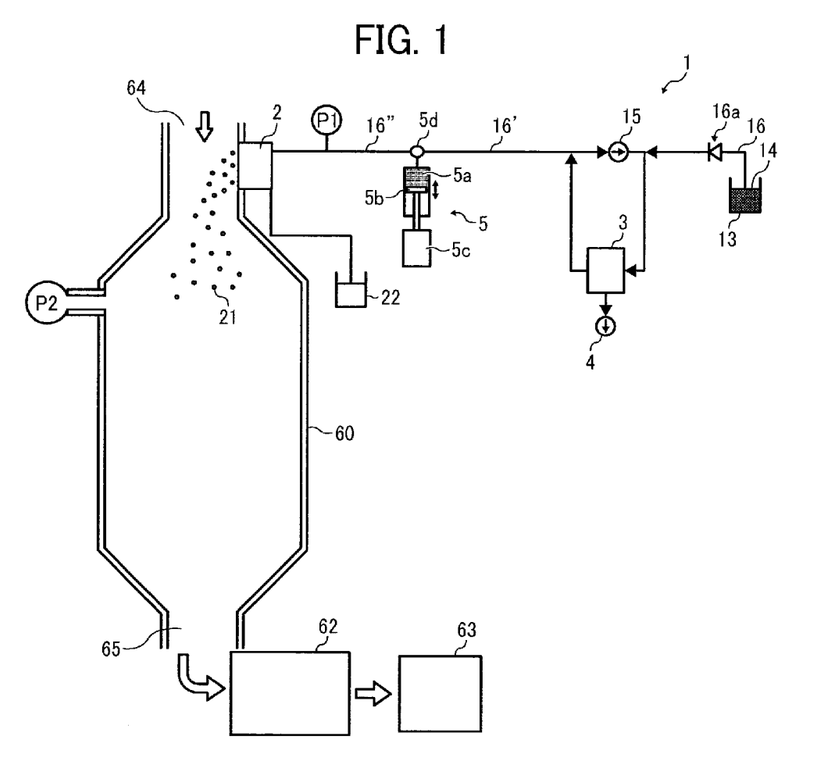
FIG. 1 is a schematic view illustrating an embodiment of the toner preparation apparatus of the present invention.

FIG. 1 is a schematic view illustrating an embodiment of the toner preparation apparatus of the present invention.

The toner preparation apparatus is mainly formed of a droplet discharge unit, a liquid feed unit, and a dry and collection unit. The liquid feed unit feeds a liquid to the droplet discharge unit, the droplet discharge unit discharges a liquid to form a droplet, and the dry and collection unit dies and solidifies the discharged droplet. The toner preparation apparatus prepares a particulate toner with each of the units.

In the present invention, the liquid including a particulate element may not include a solvent and includes a liquid in which the particulate element is dissolved or dispersed and a liquid in which the particulate element is melt. Hereinafter, the "liquid including a particulate element" is explained as a "toner component liquid".

(Liquid Feed Unit)

In order to feed a liquid to the discharge unit, the liquid feed unit includes a material container 13 containing a toner component liquid 14, a deaerator 3 dehydrating a gas dissolved in the toner component liquid 14, a feed pathway 16 feeding the toner component liquid 14 from the material container 13 to the deaerator 3, a temporary reservoir 5 temporarily reserving the dehydrated liquid, a feed pathway 16' feeding the toner component liquid 14 to the temporary reservoir 5, a feed pathway 16" feeding the toner component liquid 14 from the temporary reservoir 5 to a discharge unit 2 as a droplet discharger, and a waste liquid tank 22.

The material container 13 contains the toner component liquid 14 and feeds the toner component liquid 14 to the deaerator 3 through the feed pathway 16. The liquid feed pathway 16 preferably includes a check valve 16a to prevent the toner component liquid 14 from flowing back to the material container 13 from the deaerator 3. In the material container 13, the toner component liquid 14 is preferably stirred to prevent a solid content from settling out.

The deaerator 3 is used to remove the gas dissolved in the toner component liquid 14 to stabilize discharging. Known deaerators reducing a pressure in the container to remove a gas dissolved in a liquid or applying an ultra sonic to a liquid can be used as the deaerator 3. In the present invention, a deaerator using a hollow fiber film (dehydration module SEPARERL PF03DG from DIC Corp.) is used, the toner component liquid 14 passes a batch of hollow fibers having gas permeability, and a pump 4 reduces a pressure in the container of the batch of hollow fibers to remove only the gas dissolved in the toner component liquid.

The deaerator 3 can be located in a circulation pathway circulating the toner component liquid 14 in a closed system. When the deaerator 3 is located in the circulation pathway, the toner component liquid 14 passes the deaerator for plural times to reduce the gas dissolved in the liquid more than one time.

The temporary reservoir 5 temporarily reserve the dehydrated toner component liquid 14, protecting the liquid from outer air, and feeds the liquid to the discharge unit 2. It is preferable to properly control a pressure of the toner component liquid 14 fed to the discharge unit 2 to stabilize discharging. The temporary reservoir 5 is formed of a cylinder 5a including the toner component liquid 14 and a piston 5b pressing the toner component liquid 14. Thus, a sealed container blocking outer air is formed. Further, the piston 5b reciprocates to control capacity in the sealed container. Further, the piston 5b is connected with an electric cylinder 5c and a vertical displacement can be controlled.

The cylinder 5a forming the sealed container has a hole for introducing and discharging the toner component liquid 14 an includes a three-way valve 5d. The feed pathway 16' from the deaerator 3 to the temporary reservoir 5 and the feed pathway 16" from the temporary reservoir 5 to the discharge unit 2 are connected with the cylinder 5a inside through the three-way valve 5d. The pathway of the three-way valve 5d is a pathway from the deaerator 3 to the feed pathway 16' and the cylinder 5a when the toner component liquid 14 is filled in the temporary reservoir 5, and is the feed pathway 16" from the cylinder 5a to the discharge unit 2 when the liquid is fed from the temporary reservoir 5 to the discharge unit 2. The discharge unit includes a discharge pathway and a waste liquid tank 22 besides the feed pathway, which are used when unnecessary toner component liquid is discharged from the discharge unit and collected. The waste liquid tank 22 includes an on-off valve preventing the toner component liquid from flowing back, and the on-off valve is closed except when the unnecessary toner component liquid is discharged such that the toner component liquid does not flow back.

The displacement of the electric cylinder 5c is controlled by an unillustrated pressure controller according to a measured value of a pressure gauge P1 located in the feed pathway 16", detecting a pressure of the toner component liquid 14 such that the value is constant. Specifically, when the value of the pressure gauge P1 is below a threshold, the piston is moved to reduce the capacity of the cylinder, and when over the threshold, the piston is moved to increase the capacity thereof. Thus, a pressure to the droplet discharge unit can be controlled to be virtually constant. It is preferable that a pressure P1 to the droplet discharge unit and a pressure P2 of the dry and collection unit are nearly equal to each other. When P1 is larger than P2, the toner component liquid 14 possibly exudes from a nozzle (discharge) hole 19 of a droplet discharge head 11, and when P2 is larger than P1, a gas possibly enters the droplet discharge head 11 and stops discharging.

(Droplet Discharge Unit)

The droplet discharge unit 2 include the droplet discharge head 11 which is a liquid chamber having a liquid spray area communicating with outside through the discharge hole and including plural arrayed droplet discharge heads spraying the toner component liquid in a liquid-column resonance liquid chamber generating a liquid-column resonant standing wave under the after-mentioned conditions from the discharge hole as a droplet.

Figure 2:
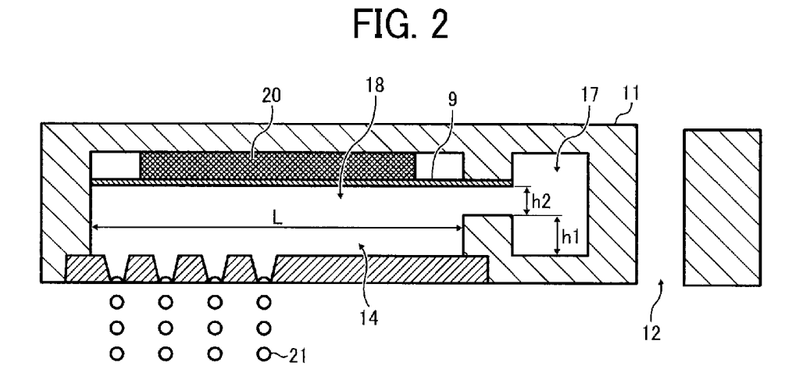
FIG. 2 is a cross-sectional view illustrating a configuration of a liquid-column resonance droplet former.

The droplet discharge head includes, as FIG. 2 shows, a liquid common feed pathway 17 and a liquid-column resonance liquid chamber (flow pathway) 18. The liquid-column resonance liquid chamber 18 is communicated with the liquid common feed pathway 17 located on one of wall surfaces at both ends in a longitudinal direction. The liquid-column resonance liquid chamber 18 includes a toner discharge hole 19 discharging a toner droplet 21 on one of the wall surfaces at the both ends and an oscillator 20 located on the wall surface opposite to the toner discharge hole 19, generating a high-frequency oscillation to form a liquid-column resonant standing wave. The oscillator 20 is connected with an unillustrated high-frequency electric source, and an airstream pathway 12 through which airstream passes is formed nearly parallel to a discharge direction of the droplet 21.

A pressure distribution is formed by the liquid-column resonant standing wave generated by the oscillator 20 in the liquid-column resonance liquid chamber 18 filled with the toner component liquid 14. The droplet 21 is discharged from the discharge hole 19 located at an abdominal area of the standing wave having large amplitude and pressure variation.

The abdominal area of the standing wave by the liquid-column resonance is an area besides a node of the standing wave. Preferably an area where the pressure variation of the standing wave has an amplitude large enough to discharge the liquid, and more preferably in a range within ±¼ wavelength from a position where the pressure standing wave has a maximum amplitude (a node as a velocity standing wave) to a position where the pressure standing wave has a minimum amplitude. Even plural discharge holes form uniform droplets, respectively when they are in the abdominal area of the standing wave, and further efficiently discharge droplets and are difficult to get clogged. The toner component liquid 14 having passed the liquid common feed pathway 17 is returned to the material container through an unillustrated liquid return tube.

When the toner component liquid 14 in the liquid-column resonance liquid chamber 18 decreases, a suction power of the liquid-column resonant standing wave therein increases the toner component liquid 14 fed from the liquid common feed pathway 17, and the toner component liquid 14 is filled in the liquid-column resonance liquid chamber 18. When the liquid-column resonance liquid chamber 18 is filled with toner component liquid 14, the volume thereof passing the liquid common feed pathway 17 returns to be normal.

Figure 3:
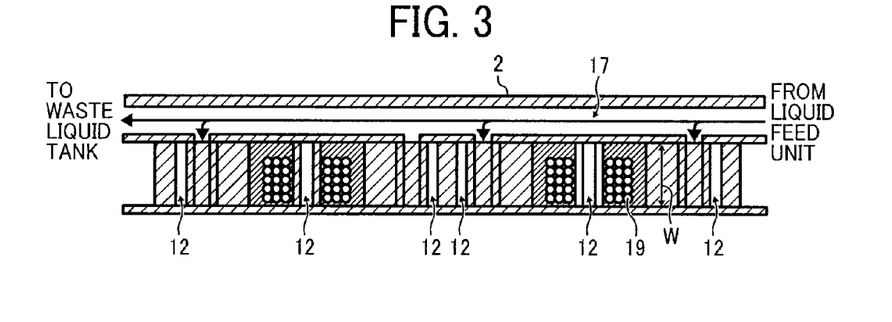
FIG. 3 is a cross-sectional view illustrating a configuration of a liquid-column resonance droplet unit.

The liquid-column resonance liquid chamber 18 is formed of joined frames made of materials high rigidity so as not to influence the resonant frequency of a liquid, such as metals, ceramics and silicon. As FIG. 2 shows, a length L between wall surfaces at both ends of the liquid-column resonance liquid chamber 18 in a longitudinal direction is determined, based on a liquid-column resonance principle mentioned later. A width of the liquid-column resonance liquid chamber 18 in FIG. 3 is preferably less than a half of the length L thereof so as not to impart an unnecessary frequency to the liquid-column resonance. Further, plural liquid-column resonance liquid chambers 18 are preferably located in one droplet discharge unit 2 to noticeably improve productivity. The number of the liquid-column resonance liquid chamber 18 is not limited, and the droplet discharge unit preferably includes 100 to 2,000 liquid-column resonance liquid chambers 18 to have both operability and productivity. A flow pathway for feeding a liquid is communicated with each of the liquid-column resonance liquid chambers from the liquid common feed pathway 17, which is communicated with plural liquid-column resonance liquid chambers.

The oscillator 20 is not particularly limited if driven by a predetermined frequency, and a piezoelectric body is preferably laminated on an elastic plate 9. The elastic plate forms a part of the wall of the liquid-column resonance liquid chamber such that the piezoelectric body does not contact the liquid. A piezoelectric ceramic such as lead zirconate titanate (PZT) can be used as the piezoelectric body, and is typically layered because of having a small displacement. Besides, piezoelectric polymers such as polyvinylidenefluoride, and single crystals such as crystals, $LiNbO_3$, $LiTaO_3$ and $KNbO_3$ can also be used. The oscillator 20 is preferably located in each of the liquid-column resonance liquid chambers so as to individually be controlled. The blockish oscillator is partially cut according to the location of the liquid-column resonance liquid chamber so as to individually control each of them through the elastic plate.

The discharge hole 19 preferably has an opening having a diameter of from 1 to 40 μm. When less than 1 μm, the droplet is too small to prepare a toner, and the discharge hole 19 is frequently clogged when toner materials includes solid particulate materials such as pigments, resulting in deterioration of productivity. When larger than 40 μm, the toner composition needs to be diluted in a very thin organic solvent when dried and solidified to prepare a toner having a desired particle diameter of from 3 to 6 μm, and a large amount of drying energy is needed to prepare a specific amount of the toner. As shown in FIG. 2, discharge holes 19 are preferably formed in a width direction of the liquid-column resonance liquid chamber 18 because many of them are formed to increase production efficiency. The liquid-column resonant frequency is preferably determined after seeing discharge of the droplet because of varying according to a location of the discharge hole 19.

The discharge hole 19 has a tapered cross-sectional shape so as to have a smaller diameter at the opening in FIG. 2, and can have any shapes.

FIGS. 4A to 4D are cross-sectional shaped the discharge hole 19 can have.

Figure 4A:
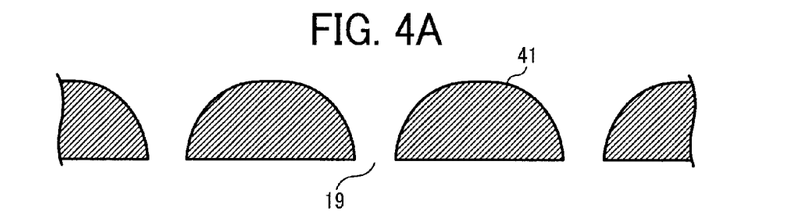
FIGS. 4A to 4D are cross-sectional views illustrating discharge holes.

FIG. 4A has a shape so as to have a narrower opening while having a round form from a liquid contact surface to a discharge exit of the discharge hole 19. When a thin film 41 oscillates, a pressure to the liquid is maximum at the exit of the discharge hole 19 and the shape is most preferable in stable discharging.

Figure 4B:
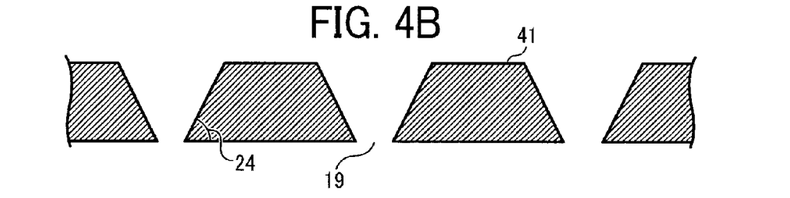
Figure 4C:
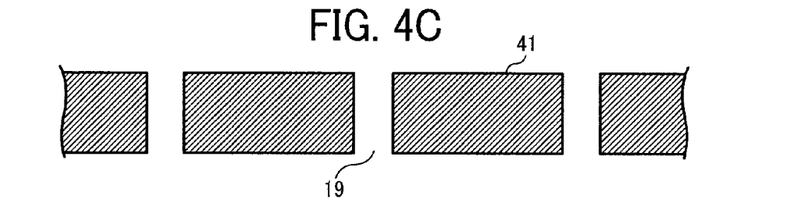

FIG. 4B has a shape so as to have a narrower opening at a specific changeable angle from a liquid contact surface to a discharge exit of the discharge hole 19. When a thin film 41 oscillates at the same angle of the nozzle in FIG. 4A, a pressure to the liquid can be increased the exit of the discharge hole 19, and the angle is preferably from 60 to 90°. When less than 60°, it is difficult to apply a pressure to the liquid and the thin film is difficult to modify. FIG. 4C is the nozzle having an angle of 90°, and it is difficult to apply a pressure to the exit and 90° is a maximum. When greater than 90°, no pressure is applied to the exit of the discharge hole 19 and droplet does not stably discharge at all.

Figure 4D:
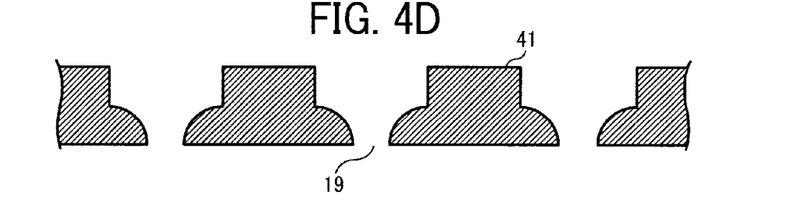

FIG. 4D is a combination of FIGS. 4A and 4B. The shape may be changed in stages in this way.

Next, the droplet forming mechanism by the droplet forming unit in the liquid-column resonance is explained.

First, the principle of the liquid-column resonance phenomenon arising in the liquid-column resonance liquid chamber 18 in FIG. 2 is explained. The liquid resonance generates a wavelength λ has the following relationship.

$$\lambda = c/f \qquad (1)$$

wherein c represents a sound velocity of the toner component liquid in the liquid-column resonance liquid chamber 18; and f represents a drive frequency applied from the oscillator 20 to the toner component liquid.

In the liquid-column resonance liquid chamber 18 in FIG. 2, L is a length from a fixed end to an end at the liquid common feed pathway 17, and the end at the liquid common feed pathway 17 has a height h1 (=about 80 μm) which is about 2 times as high as a height h2 (=about 40 μm) of a communication opening. When the both ends are fixed, a resonance is most efficiently formed if the length L is an even multiple of ¼ of the wavelength λ. Namely, the following relationship is satisfied.

$$L = (N/4)\lambda \qquad (2)$$

wherein N is an even number.

Even when the both ends are completely open, the above-mentioned relationship is satisfied.

When one end is open and the other end is closed (fixed), a resonance is most efficiently formed if the length L is an odd multiple of ¼ of the wavelength λ. Namely, N is an odd number.

The most efficient drive frequency f is determined by the following formula.

$$f = N \times c/(4L) \qquad (3)$$

However, actually the liquid has viscosity attenuating the resonance, and the oscillation is not limitlessly amplified. As formulae (4) and (5) show, even a frequency having a Q value, close to the most efficient drive frequency f having the formula (3) generates a resonance.

Figure 5A:
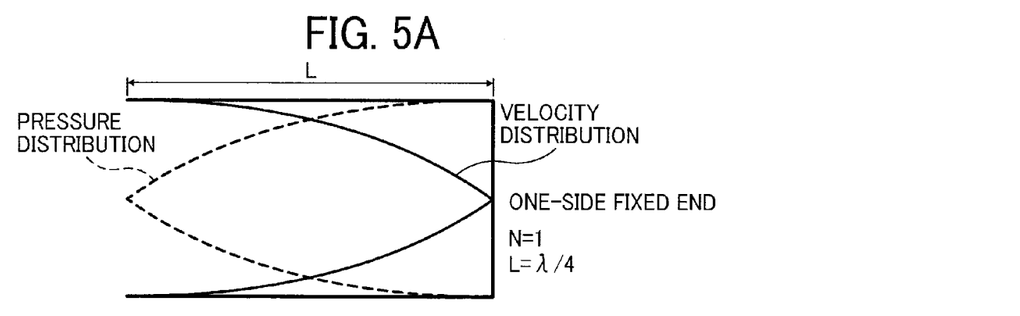
FIGS. 5A to 5D are schematic views illustrating standing waves of velocity and pressure variation when N is 1, 2 and 3.
Figure 5B:
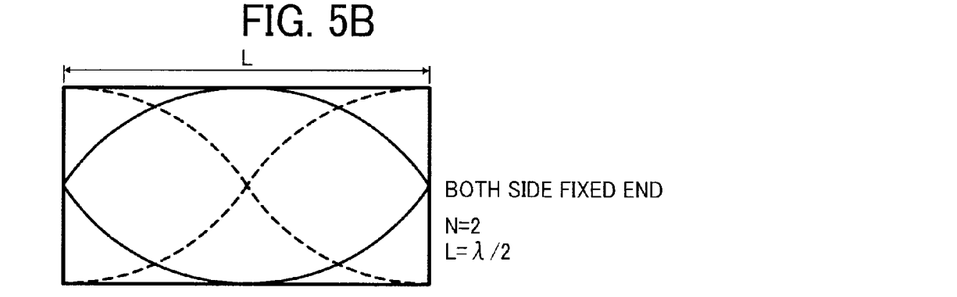
Figure 5C:
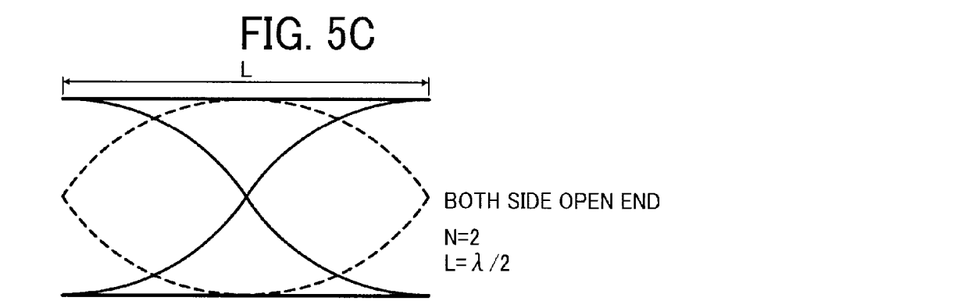
Figure 5D:
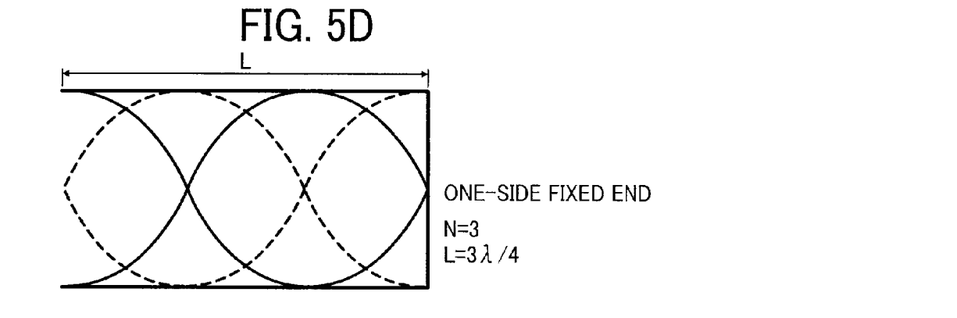
Figure 6A:
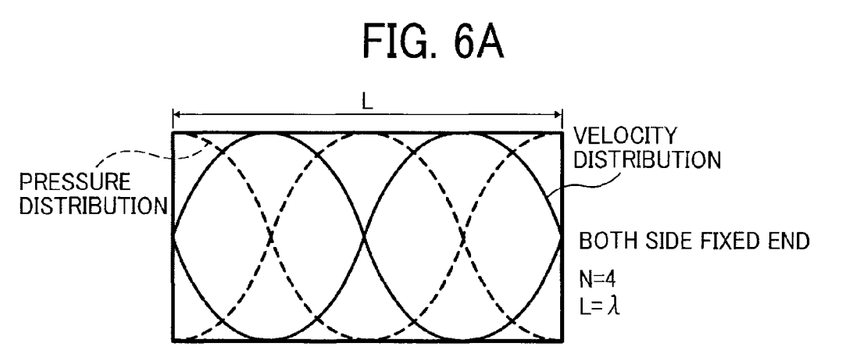
FIGS. 6A to 6C are schematic views illustrating standing waves of velocity and pressure variation when N is 4 and 5.
Figure 6B:
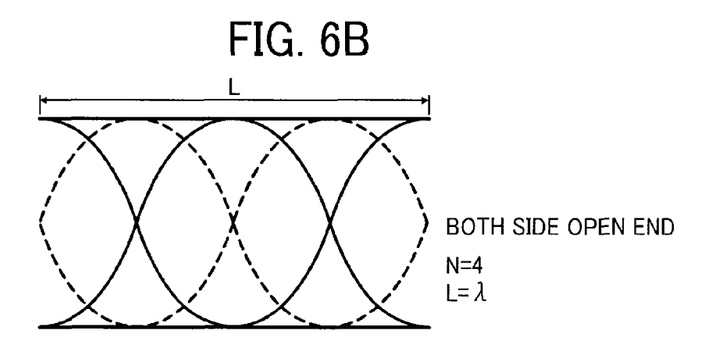
Figure 6C:
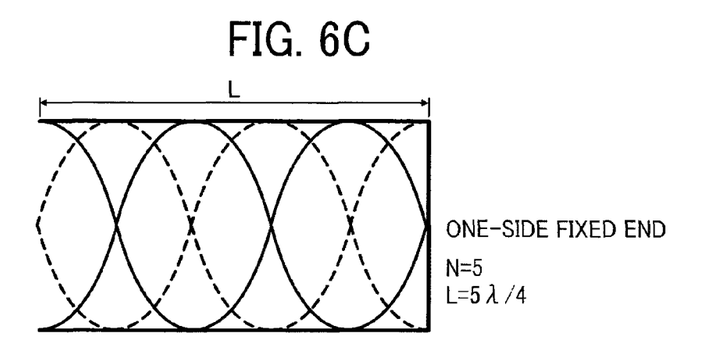

FIGS. 5A to 5D are shapes of standing waves (resonance mode) having a velocity and a pressure variation when N is 1, 2 and 3, and FIGS. 6A to 6C are shapes of standing waves (resonance mode) having a velocity and a pressure variation when N is 4 and 5. Under ordinary circumstances, the standing waves are density waves (longitudinal waves), but they are typically described as FIGS. 5A to 5D and 6A to 6C. A solid line is a velocity standing wave and a dashed line is a pressure standing wave.

As FIG. 4A representing one-side fixed end when N is 1 shows, the velocity distribution has zero amplitude at a closed end and a maximum amplitude at an open end, which is instinctively understandable. The standing wave most efficiently arises when N is from 1 to 5 when a length of both ends of the liquid-column resonance liquid chamber in a longitudinal direction is L and a wavelength at which the liquid liquid-column resonates is λ. The standing wave patterns differ according to opening and closing of the both ends, and they are described as well. As mentioned later, conditions of the end depends on openings of the discharge hole or the feeder.

In acoustics, an open end is an end where a medium (liquid) has a travel velocity of zero in a longitudinal direction, but has a maximum pressure. A closed end is an end where a medium has a travel velocity of zero. The closed end is acoustically thought a hard wall and wave reflection arises. When the end is completely open or closed ideally, waves are overlapped to form resonant standing waves in FIGS. 5A to 5D and 6A to 6C. The number and location of the discharge holes vary the standing wave patterns, and a resonant frequency appears at a position different from a position determined by the formula (3), but the drive frequency is properly adjusted to determine stable discharge conditions. For example, when the liquid has a sound velocity of 1,200 m/s, the liquid-column resonance liquid chamber has a length L of 1.85 mm, and walls exist at both ends and a N=2 resonance mode completely equivalent to both-side fixed ends, the most efficient resonant frequency is determined to be 324 kHz from the formula (2). When the liquid has a sound velocity of 1,200 m/s, the liquid-column resonance liquid chamber has a length L of 1.85 mm, and walls exist at both ends and a N=4 resonance mode equivalent to both-side fixed ends, the most efficient resonant frequency is determined to be 648 kHz from the formula (2). Even with the same liquid-column resonance liquid chamber, higher level resonance can be used.

The liquid-column resonance liquid chamber in FIG. 2 is equivalent to both closed ends. In consequence of an opening of the discharge hole, the end is preferably like a soft wall acoustically to increase frequency, but may be open. The consequence of an opening of the discharge hole means that an acoustic impedance decreases, and particularly a compliance component increases. Therefore, the liquid-column resonance liquid chambers forming walls at both ends in a longitudinal direction in FIGS. 5B and 6A are preferably used because of being capable of using all resonance modes, i.e., both-side fixed ends and one-side open end.

The number of openings of the discharge hole, locations thereof and a cross-sectional shape of the discharge hole are elements of deciding the drive frequency, and the drive frequency is properly determined. When the number of the discharge holes is increased, the restraint of the fixed end of the liquid-column resonance liquid chamber gradually looses and a resonant standing wave nearly close to an open end arises to increase the drive frequency. Further, from the location of an opening of the discharge hole present closest to the liquid feed pathway, the restraint begins to loose, the discharge hole has a round cross-sectional shape, or the discharge hole varies in volume due to the thickness of frame, the actual standing wave has a short wavelength to increase the drive frequency. When a voltage is applied to the oscillator with the thus determined drive frequency, the oscillator is deformed to most efficiently generate a resonant standing wave with the drive frequency. A liquid-column resonant standing wave generates even with a frequency close to the drive frequency a resonant standing wave most efficiently generates with. Namely, when the liquid-column resonance liquid chamber has a length L between both ends in a longitudinal direction and a distance Le to the discharge hole closest to an end of the liquid feed side, a drive waveform including a drive frequency f determined by the following formulae (4) and (5) including L and Le as a main component is used to oscillate the oscillator to induce a liquid-column resonance to discharge a droplet from the discharge hole.

$$N \times c/(4L) \leq f \leq N \times c/(4Le) \qquad (4)$$

$$N \times c/(4L) \leq f \leq (N+1) \times c/(4Le) \qquad (5)$$

Further, Le/L is preferably larger than 0.6.

The above-mentioned principle of the liquid-column resonance phenomenon is used to from a liquid-column resonant pressure standing wave in the liquid-column resonance liquid chamber 18 in FIG. 2, droplets are continuously discharged from the discharge hole 19 located on a part of the liquid-column resonance liquid chamber 18. When the discharge hole 19 is located at a position where the standing wave most varies in pressure, the discharge efficiency increases and the discharge can be made at low voltage. The liquid-column resonance liquid chamber 18 may include one discharge hole 19, and preferably includes plural, specifically 2 to 200 discharge holes 19 in terms of productivity. When greater than 100, a voltage applied to the oscillator 20 needs to be high to discharge a desired droplet from more than 100 discharge holes and a piezoelectric body as the oscillator 20 unstably behaves. When plural discharge holes 19 are opened, a pitch among the holes preferably from 20 μm to a length of the liquid-column resonance liquid chamber. When less than 20 μm, it is highly possible that droplets discharged from the holes adjacent to each other are combined to be a large droplet, resulting in deterioration of particle diameter distribution of a toner.

Next, the liquid-column resonance phenomenon arising in the liquid-column resonance liquid chamber in the droplet discharge head of the droplet forming unit is explained, using FIGS. 7A to 7E. In FIGS. 7A to 7E, a solid line in the liquid-column resonance liquid chamber represents a velocity distribution at random positions from the fixed end to the end of the common feed pathway, and a direction therefrom to the liquid-column resonance liquid chamber is + and the reverse direction is −. A dashed line in the liquid-column resonance liquid chamber represents a pressure distribution at random positions from the fixed end to the end of the common feed pathway, and a positive pressure relative to the atmospheric pressure is + and a negative pressure thereto is −. The positive pressure is applied downward in FIGS. 7A to 7E and the negative pressure is applied upward therein. Further, in FIGS. 7A to 7E, the side of the common feed pathway is open, and the frame has a height (h1 in FIG. 2) is not less than two times as high as a height of an opening (h2 in FIG. 2) communicated through the common feed pathway 17 and the liquid-column resonance liquid chamber 18. Therefore, the velocity and pressure distributions therein show their temporary variation under approximate conditions that the liquid-column resonance liquid chamber 18 has nearly fixed ends at both sides.

Figure 7A:
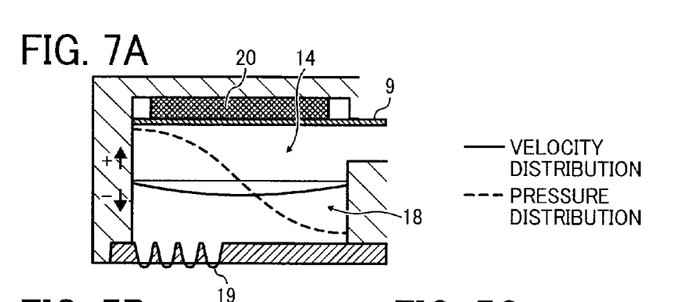
FIGS. 7A to 7E are schematic views illustrating a liquid-column resonance in a liquid-column resonance flow pathway of the liquid-column resonance droplet former.
Figure 7B:
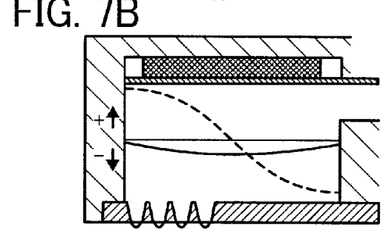
Figure 7C:
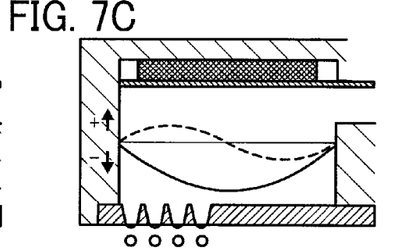

FIG. 7A shows a pressure and velocity waveforms in the liquid-column resonance liquid chamber 18 when discharging a droplet. FIG. 7B shows that a meniscus pressure increases again after the liquid is drawn just after the droplet is discharged. As FIGS. 7A and 7B show, a pressure in a pathway where the discharge hole 19 is formed is maximum in the liquid-column resonance liquid chamber 18. Then, as FIG. 7C shows, the positive pressure near the discharge hole 19 decreases and transfers to the negative pressure to discharge a droplet 21.

Figure 7D:
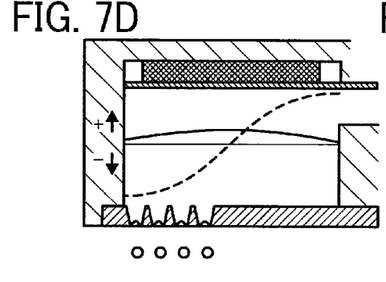
Figure 7E:
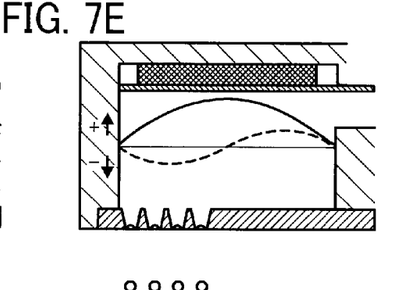

Then, as FIG. 7D shows, a pressure near the discharge hole 19 becomes minimum. Since then, filling the toner component liquid 14 in the liquid-column resonance liquid chamber 18 begins. Then, as FIG. 7E shows, the negative pressure near the discharge hole 19 decreases and transfers to the positive pressure. At this point, filling the toner component liquid 14 is finished. Then again, as FIG. 7A shows, the positive pressure of the droplet discharge area in the liquid-column resonance liquid chamber 18 to discharge a droplet 21 from the discharge hole 19. Thus, in the liquid-column resonance liquid chamber, the oscillator is driven to form a high frequency to generate standing wave by liquid-column resonance. Further, since the discharge hole 19 is located at a droplet discharge area corresponding to an abdominal area of the standing wave by the liquid-column resonance, where the pressure varies most, the droplet 21 is continuously discharged from the discharge hole 19 according to a cycle of the abdominal area.

Next, a configuration of discharging a droplet by the liquid-column resonance phenomenon for use in the present invention is explained. In FIG. 2, the liquid-column resonance liquid chamber 18 has a length L of 1.85 mm between both ends in a longitudinal direction, from the first to fourth discharge holes are located at an abdominal position of a pressure standing wave of N=2 resonance mode, and the drive frequency is a sine wave of 330 kHz. The discharge hole has an opening having a diameter of 10 μm, and droplets having a uniform diameter are discharged at a constant velocity when observed by laser shadow graphic method. The first to fourth nozzles discharge at a uniform and maximum velocity near the drive frequency of 330 kHz. Namely, uniform discharge is performed at the abdominal position of the liquid-column resonant standing wave when the drive frequency is 330 kHz which is a second mode of the liquid-column resonant frequency.

(Dry and Collection Unit)

The dry and collection unit solidifies a droplet of the toner component liquid discharged in the air from the droplet discharger and collects the solidified droplet as a particulate toner.

Figure 8:
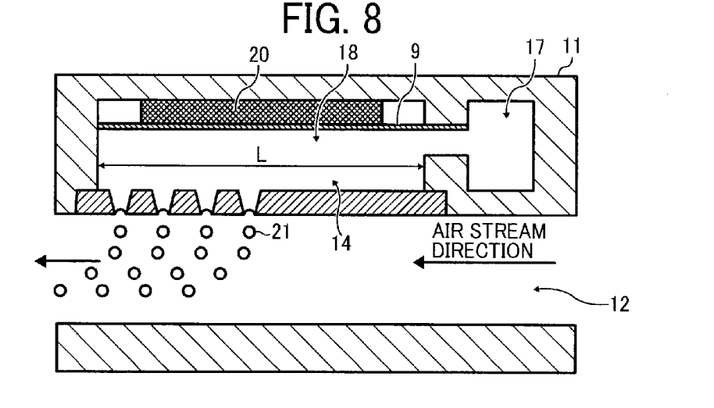
FIG. 8 is a schematic view illustrating another configuration of the liquid-column resonance droplet former.

The dry and collection unit 60 includes a chamber, a toner collector (solidified particulate collector) 62 and a toner reservoir (solidified particulate reservoir) 63. In the chamber, an unillustrated carrier airstream generator generates a falling carrier airstream, and airstream enters a carrier airstream entrance 64 and discharges from a carrier airstream discharge spout 65. In FIG. 2, the carrier airstream runs nearly parallel to a discharge direction of the droplet 21. In FIG. 8, the carrier airstream runs nearly vertical to the discharge direction thereof.

In FIG. 8, the carrier airstream runs nearly vertical to the droplet discharge direction from the droplet discharger, and the droplet flies at higher velocity to prevent the droplets from being combined. A toner droplet discharged in a horizontal direction from the discharge hole 19 of the droplet discharger of the droplet discharge unit is transferred not only by gravity but also downward carrier airstream, and the droplet is transferred at higher speed by a velocity component of the carrier airstream, which prevents the discharged toner droplet from decreasing in velocity due to air resistance. Further, a distance between each droplet enlarges when the flying direction is changed. When the toner droplets are continuously discharged, a toner droplet discharged prior to another droplet decreases in velocity due to air resistance and is overtaken by the droplet discharged afterward to be combined therewith and form a large droplet. This is well prevented in FIG. 8.

As a carrier airstream generator, a method of locating an air blower upstream to pressurize or a method of suctioning by the toner collector 62 to depressurize can be used. The particulate toner collected by the toner collector 62 passes through a toner collection tube (unillustrated) communicated with the chamber is reserved in the toner reservoir 63.

The liquid just after discharged from the droplet discharger is gradually dried when a volatile solvent included in the toner component liquid volatilizes. Thus, the droplet changes from a liquid to a solid. The solid is collected by the toner collector 62 as a toner powder. The collected toner powder is then contained in the toner reservoir 63. The collected toner powder is then contained in the toner reservoir 63. The toner contained in the toner reservoir 63 is further dried in another process when necessary.

(Toner)

Next, a toner as an embodiment of particulate is explained.

The toner is prepared by the above-mentioned method using the above-mentioned apparatus, which has a monodisperse particle diameter distribution.

Specifically, the toner preferably has a ratio of a weight-average particle diameter to a number-average particle diameter thereof of from 1.00 to 1.15. In addition, the toner preferably has the weight-average particle diameter of from 1 to 20 μm, and more preferably from 3 to 10 μm.

Next, the toner materials for use in the present invention will be explained. First, the toner component liquid including toner compositions dispersed or dissolved in a solvent is explained.

Conventional toner materials for electrophotography can be used. Namely, a toner binder such as a styrene-acrylic resin, a polyester resin, a polyol resin and an epoxy resin is dissolved in an organic solvent to prepare a solution, and a colorant and a release agent is dispersed or dissolved therein to prepare a toner component liquid. Then, the toner constituent liquid is finely dripped, dried and solidified to prepare the toner particles of the present invention.

The toner materials include at least a binder resin, a colorant and a wax, and other components such as a charge controlling agent and additives when necessary.

Specific examples of the binder resin include, but are not limited to, conventionally-used resins such as a vinyl polymers including styrene monomers, acrylic monomers or methacrylic monomers, or copolymers including two or more of the monomers; polyester polymers; polyol resins; phenol resins; silicone resins; polyurethane resins; polyamide resins; furan resins; epoxy resins; xylene resins; terpene resins; coumarone-indene resins; polycarbonate resins; petroleum resins; etc.

When the binder resin is selected from styrene-acrylic resins, the binder resin preferably includes elements soluble with tetrahydrofuran (THF), having at least one peak in a range of 3,000 to 50,000 (number-average molecular weight) and at one peak in a range not less than 100,000 in a molecular weight distribution by GPC thereof in terms of the fixability, offset resistance and storage stability of the resultant toner. In addition, the THF-soluble elements having a molecular weight not greater than 100,000 is preferably from 50 to 90% by weight based on total weight of the THF-soluble elements. Further, the THF-soluble elements preferably have a main peak in a molecular weight range of from 5,000 to 30,000, and more preferably from 5,000 to 20,000.

When the binder resin is selected from vinyl polymers such as styrene-acrylic resins, the binder resin preferably has an acid value of from 0.1 to 100 mg KOH/g, more preferably from 0.1 to 70 mg KOH/g, and much more preferably from 0.1 to 50 mg KOH/g.

When the binder resin is a polyester resin, the binder resin preferably includes elements soluble with tetrahydrofuran (THF), having at least one peak in a range of 3,000 to 50,000 (number-average molecular weight) in a molecular weight distribution by GPC thereof in terms of the fixability and offset resistance of the resultant toner. In addition, the THF-soluble elements having a molecular weight not greater than 100,000 is preferably from 60 to 100% by weight based on total weight of the THF-soluble elements. Further, the THF-soluble elements preferably have a main peak in a molecular weight range of from 5,000 to 20,000.

When the binder resin is a polyester resin, the binder resin preferably has an acid value of from 0.1 to 100 mgKOH/g, more preferably from 0.1 to 70 mgKOH/g, and most preferably from 0.1 to 50 mgKOH/g.

The molecular weight distribution of the binder resin is measured by gel permeation chromatography (GPC) using THF as a solvent.

In the vinyl polymers and/or polyester resins, resins including monomers reactable therewith can be used. Specific examples of the monomers forming the polyester resin, reactable with the vinyl polymer include unsaturated dicarboxylic acids or their anhydrides such as a phthalic acid, a maleic acid, a citraconic acid and an itaconic acid. Specific examples of the monomers forming the vinyl polymer include monomers having a carboxyl group or a hydroxy group, and an acrylic acid or ester methacrylates.

When the polyester polymer, vinyl polymer and other binder resins are used together, the united resins preferably includes resins having an acid value of from 0.1 to 50 mgKOH/g in an amount of 60% by weight.

The acid value of the binder resin can be measured according to JIS K-0070 as follows.

(1) Additives besides the binder resin (polymer) are removed from a sample or an acid value and a content of the additives besides the binder resin are measured before measured. 0.5 to 2.0 g of the sample is precisely weighed and the weight of the polymer is W g. For example, when the acid value of a binder resin in a toner is measured, the acid value and content of a colorant or a magnetic material are measured beforehand, and the acid value of the binder resin is calculated.

(2) The samples are dissolved with 150 ml of a mixture of toluene/ethanol (volume ratio 4/1) to prepare a solution in a beaker having a capacity of 300 ml.

(3) The solution is titrated with a potentiometric titrator using an ethanol solution 0.1 mol/1 KOH.

(4) The usage of the ethanol solution is S (ml), and at the same time, the usage thereof without the sample is B (ml) and the acid value is determined by the following formula:

$$\text{acid value (mg KOH/g)} = [(S-B) \times f \times 5.61]/W$$

wherein f is a factor of KOH.

The binder resin and constituents including the binder resin of the toner preferably has a glass transition temperature of from 35 to 80° C., and more preferably from 40 to 75° C. in terms of the storage stability of the resultant toner. When lower than 35° C., the resultant toner tends to deteriorate in an environment of high temperature, and have offset problems when fixed. When higher than 80° C., the fixability occasionally deteriorates.

Specific examples of magnetic materials for use in the present invention include (1) magnetic iron oxides such as magnetite, maghematite and ferrite and iron oxides including other metal oxides; (2) metals such as iron, cobalt and nickel or their metal alloys with metals such as aluminum, cobalt, copper, lead, magnesium, tin, zinc, antimony, beryllium, bismuth, cadmium, calcium, manganese, selenium, titanium, tungsten and vanadium; and (3) their mixtures.

Specific examples thereof include $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, an iron powder, a cobalt powder, a nickel powder, etc. These can be used alone or in combination. Particularly, fine powders of $Fe_3O_4$ and $\gamma\text{-}Fe_2O_3$ are preferably used.

In addition, magnetic iron oxides such as magnetite, maghematite and ferrite including a heterogeneous element or their mixtures can also be used. Specific examples of the heterogeneous element include lithium, beryllium, boron, magnesium, aluminum, silicon, phosphorus, germanium, zirconium, tin, sulfur, calcium, scandium, titanium vanadium, chrome, manganese, cobalt, nickel, copper, zinc, gallium, etc. Particularly, magnesium, aluminum, silicon, phosphorus or zirconium is preferably used. The heterogeneous element may be taken in a crystal lattice of the iron oxide or therein as an oxide. Alternatively, the heterogeneous element may be present on the surface thereof as an oxide or a hydroxide. The heterogeneous element is preferably included therein as an oxide.

The heterogeneous element can be taken in a magnetic material by mixing a salt thereof when preparing the magnetic material and performing a pH control. In addition, the heterogeneous element can be separated out on the surface of a magnetic material by performing the pH control or adding the salt thereof and performing the pH control after preparing the magnetic material.

The toner preferably includes the magnetic material in an amount of from 10 to 200 parts by weight, and more preferably from 20 to 150 parts by weight per 100 parts by weight of the binder resin. The magnetic material preferably has a number-average particle diameter of from 0.1 to 2 μm, and more preferably from 0.1 to 0.5 μm. The number-average particle diameter can be determined by measuring a photograph thereof, zoomed by a transmission electron microscope, with a digitizer, etc.

The magnetic material preferably has a coercivity of from 2 to 150 Oe, a saturated magnetization of from 50 to 200 emu/g and a residual magnetization of from 2 to 20 emu/g when applied with 10 kOe. The magnetic material can be used as a colorant.

Specific examples of the colorants for use in the present invention include any known dyes and pigments such as carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and their mixtures.

The toner preferably includes the colorant in an amount of from 1 to 15% by weight, and more preferably from 3 to 10% by weight.

The colorant for use in the present invention can be used as a masterbatch when combined with a resin. Specific examples of the resin used in the masterbatch or used with the masterbatch include the modified and unmodified polyester resins mentioned above; styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutylmethacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

The masterbatch can be prepared by mixing and kneading a resin and a colorant upon application of high shearing stress thereto. In this case, an organic solvent is preferably used to increase interactions between the colorant and the resin. In addition, flushing methods, wherein an aqueous paste including a colorant is mixed with a resin solution of an organic solvent to transfer the colorant to the resin solution and then the aqueous liquid and organic solvent are separated and removed, is preferably used because the resultant wet cake of the colorant can be used as it is. A three roll mill is preferably used for kneading the mixture upon application of high shearing stress.

The masterbatch is preferably used in an amount of from 0.1 to 20 parts by weight per 100 parts by weight of the binder resin.

The masterbatch preferably includes a resin having an acid value not greater than 30 mg KOH/g and an amine value of from 1 to 100 and a colorant dispersed therein, and more preferably includes a resin having an acid value not greater than 20 mg KOH/g and an amine value of from 10 to 50 and a colorant dispersed therein. When the acid value is greater than 30 mg KOH/g, the chargeability of the resultant toner occasionally deteriorates due to high humidity and the colorant is insufficiently dispersed in the masterbatch occasionally. When the amine value is less than 1 and greater than 100, the colorant is insufficiently dispersed in the masterbatch occasionally. The acid value is measured by the method disclosed in JIS K0700 and the amine value in JIS K7237.

A dispersant preferably has high compatibility with a binder resin in terms of pigment dispersibility. Specific examples of marketed products thereof include AJISPER PB821 and AJISPER PB822 from Ajinomoto Fine-Techno Co., Inc.; Disperbyk-2001 from BYK-Chemie GmbH; and EFKA-4010 from EFKA Additives B.V.

A toner preferably includes the dispersant in an amount of from 0.1 to 10% by weight based on total weight of the colorant. When less than 0.1% by weight, the pigment is insufficiently dispersed occasionally. When greater than 10% by weight, the chargeability of the resultant toner occasionally deteriorates due to high humidity.

The dispersant preferably has a weight-average molecular weight, i.e., a molecular weight at a maximum main peak in the gel permeation chromatography of a styrene-converted weight, of from 500 to 100,000, more preferably from 3,000 to 100,000, furthermore preferably from 5,000 to 50,000, and most preferably form 5,000 to 30,000 in terms of pigment dispersibility. When less than 500, the dispersant has high polarity, resulting in occasional dispersibility deterioration of the colorant. When greater than 100,000, the dispersant has high affinity with a solvent, resulting in occasional dispersibility deterioration of the colorant.

The dispersant is preferably used in an amount of from 1 to 200 parts by weight, and more preferably from 5 to 80 parts by weight per 100 parts by weight of the colorant. When less than 1 part by weight, dispersibility is insufficient. When greater than 200 parts by weight, the resultant toner occasionally deteriorates in chargeability.

The toner of the present invention may include a wax besides a binder resin and a colorant. Any known waxes can be used, and specific examples thereof include aliphatic hydrocarbon waxes such as low-molecular-weight polyethylene, low-molecular-weight polypropylene, a polyolefin wax, a microcrystalline wax, a paraffin wax and a sasol wax; aliphatic hydrocarbon wax oxides such as polyethylene oxide wax or their block copolymers; plant waxes such as a candelilla wax, a carnauba wax, a Japan wax, and a jojoba wax; animal waxes such as a bees wax, a lanolin and a whale wax; mineral waxes such as an ozokerite, a ceresin and a petrolatum; waxes mainly including fatty ester such as a montanic acid ester wax and a mosquito star wax; and waxes having partially or wholly deacidified fatty ester.

Specific examples of the wax further include saturated straight-chain fatty acids such as a palmitic acid, a stearic acid, a montanic acid and a straight-chain alkyl carboxylic acid having a straight-chain alkyl group; unsaturated fatty acids such as an eleostearic acid; saturated alcohols such as stearyl alcohol, behenyl alcohol, ceryl alcohol, mesilyl alcohol and long-chain alkyl alcohol; polyalcohols such as sorbitol; fatty acid amides such as linoleic amide, olefinic amide and lauric amide; saturated fatty acid bismaides such as methylenebisamide caprate, lauric ethylenebisamide and stearic hexamethylenebisamide; unsaturated fatty acid amides such as oleic ethylenebisamide, oleic hexamethylenebisamide, adipic N,N'-dioleylamide and sebacic N,N'-dioleylamide; aromatic bismaides such as stearic m-xylenebisamide and isophthalic N,N-distearylamide; fatty acid metal salts such as calcium stearate, calcium laurate, zinc stearate and magnesium stearate; an aliphatic hydrocarbon wax grafted with a vinyl monomer such as styrene and an acrylic acid; a partially esterified compound of fatty acids such as monoglyceride behenate and polyalcohol; and a methyl ester compound having a hydroxyl group, formed by adding a hydrogen atom to a vegetable oil.

Preferred waxes include polyolefin formed by radically polymerizing olefin under high pressure; polyolefin formed by refining a low-molecular-weight byproduct when polymerizing high-molecular-weight polyolefin; polyolefin formed by polymerizing olefin with a catalyst such as a Ziegler catalyst and a metallocene catalyst under low pressure; polyolefin formed by polymerizing olefin using a radiation, an electromagnetic ray or light; low-molecular-weight polyolefin formed by pyrolyzing high-molecular-weight polyolefin; a paraffin wax; a microcrystalline wax; a Fischer-Tropsh wax; synthetic hydrocarbon waxes synthesized by a synthol method, a hydronalium call method, etc.; synthetic waxes having a monomer having a carbon atom; hydrocarbon waxes having a functional group such as a hydroxyl group or a carboxyl group; mixtures of hydrocarbon waxes and hydrocarbon waxes having a functional group; and waxes graft-modified with a vinyl monomer such as styrene, ester maleate, acrylate, methacrylate and maleic acid anhydride.

In addition, these waxes having sharper molecular weight distributions after subjected to a press sweating process, a solvent process, a recrystallization process, a vacuum distillation process, a supercritical gas extraction process or a solution crystallization process are preferably used. Further, waxes, wherein low-molecular-weight fatty acids, low-molecular-weight solid alcohols, low-molecular-weight solid compounds and other impurities are removed from these waxes, are preferably used as well.

The wax preferably has a melting point of from 70 to 140° C., and more preferably from 70 to 120° C. to balance the fixability and offset resistance of the resultant toner. When lower than 70° C., blocking resistance thereof tends to deteriorate. When higher than 140° C., the offset resistance thereof is occasionally difficult to develop.

In addition, combinations of two or more waxes can develop plasticizability and releasability of a wax at the same time. A wax having plasticizability has a low melting point, or a branched-chain or a polar group on its molecular structure. A wax having releasability has a low melting point, or a straight-chain or nonpolar group without a functional group on its molecular structure. Specific examples of the combinations include a combination of two ore more waxes having differences of melting point of from 10 to 100° C.; and a combination of polyolefin and graft-modified polyolefin.

When two waxes having similar structures are used, combinations of a low-melting-point wax relatively having plasticizability and a high-melting-point wax relatively having releasability are preferably used. The melting points preferably have a difference from 10 to 100° C. to effectively develop their separate functions. At least one of the waxes preferably has a melting point of from 70 to 120° C., and more preferably from 70 to 100° C. to exert the functional separation effect.

Waxes having branched-chain structures, polar groups such as functional groups, or waxes modified with components different from their main components relatively exert their plasticizabilities. On the other hand, waxes having straight-chain structure, nonpolar groups without functional groups, or unmodified waxes relatively exert their releasabilities. Preferred combinations of the waxes include a combination of a polyethylene homopolymer or copolymer primarily consisting of ethylene and a polyolefin homopolymer or copolymer primarily consisting of olefin besides ethylene; a combination of polyolefin and graft-modified polyolefin; a combination of an alcohol wax, a fatty acid wax or an ester wax and a hydrocarbon wax; a combination of a Fischer-Tropsh wax or a polyolefin wax and a paraffin wax or a microcrystalline wax; a combination of a Fischer-Tropsh wax and a polyolefin wax; a combination of a paraffin wax and a microcrystalline wax; a carnauba wax, a candelilla wax, a rice wax or a montan wax and a hydrocarbon wax.

The wax preferably has an endothermic peak in a range of from 70 to 110° C., and further a maximum peak therein when measured by a DSC method to balance the storage stability and fixability of the resultant toner.

The toner of the present invention preferably includes the waxes in an amount of from 0.2 to 20 parts by weight, and more preferably from 0.5 to 10 parts by weight per 100 parts by weight of a binder resin.

The melting point of the wax is the maximum endothermic peak when measured by a DSC method.

The endothermic peak of the wax or toner is preferably measure by a high-precision inner-heat input-compensation differential scanning calorimeter. The measurement method is based on ASTM D3418-82. A DSC curve measured when the temperature is increased at 10° C./min after increasing and decreasing the temperature is used.

The toner of the present invention may include a fluidity improver. The fluidity improver is added to the surface thereof to improve the fluidity thereof.

Specific examples thereof include fluorine-containing resin powders such as carbon black, a vinylidene fluoride fine powder and a polytetrafluoroethylene fine powder; a silica fine powder such as a wet method silica and a dry method silica; a titanium oxide fine powder; an alumina fine powder; and a surface-treated silica, a surface-treated titanium oxide and a surface-treated alumina with a silane coupling agent, a titanium coupling agent or a silicone oil. Particularly, the silica fine powder, titanium oxide fine powder and alumina fine powder are preferably used. The surface-treated silica with a silane coupling agent or a silicone oil is more preferably used.

The fluidity improver preferably has an average primary particle diameter of from 0.001 to 2 μm, and more preferably from 0.002 to 0.2 μm.

Preferred silica fine powders include a fine powder prepared by vapor-phase oxidizing a silicon halogen compound, i.e. a dry method silica or a fumed silica.

Specific examples of the marketed silica fine powders include AEROSIL-130, -300, -380, -TT600, -MOX170, -MOX80 and -COK84 from NIPPON AEROSIL CO., LTD.; Ca-O-SiL-M-5, -MS-7, -MS-75, -HS-5 and -EH-5 from Cabot Corp.; Wacker HDK-N20, -V15, -N20E, -T30 and -T40 from WACKER-CHEMIEGMBH; D-CFineSilica from Dow Corning Corp.; and Fansol from Fransil.

The silica fine powder prepared by vapor-phase oxidizing a silicon halogen compound is preferably hydrophobized. The hydrophobized silica fine powder preferably has a hydrophobicity of from 30 to 80% when measured by a methanol titration method. The silica fine powder is chemically or physically hydrophobized with an organic silicon compound.

Specific examples thereof include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chlorethyltrichlorosilane, β-chloroethyltrichlorosilane, chloromethyldimethylchlorosilane, triorganosilylmercaptan, trimethylsilylmercaptan, triorganosilylacrylate, vinyldimethylacetoxysilane, dimethyletoxysilane, trimethyletoxysilane, trimethylmetoxysilane, methyltrietoxysilane, isobutyltrimetoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units and 0 to 1 hydroxyl group bonded with Si at the end unit, etc. Further, silicone oils such as a dimethyl silicone oil can also be used. These can be used alone or in combination.

The fluidity improver preferably has a number-average particle diameter of from 5 to 100 nm, and more preferably from 5 to 50 nm.

The fluidity improver preferably has a specific surface area not less than 30 m$^2$/g, and more preferably from 60 to 400 m$^2$/g when measured by a BET nitrogen absorption method. When a surface-treated fine powder, the fluidity improver preferably has a specific surface area not less than 20 m$^2$/g, and more preferably from 40 to 300 m$^2$/g.

The fluidity improver is preferably included in a toner in an amount of from 0.03 to 8 parts by weight per 100 parts by weight of the toner.

As other additives, various metal soaps, fluorine-containing surfactants and dioctylphthalate may optionally be included in the toner of the present invention for the purpose of protecting a photoreceptor or a carrier; improving the cleanability thereof; controlling heat, electrical and physical properties thereof; controlling the resistivity thereof; controlling the softening point thereof; and improving the fixability thereof; etc. As an electroconductivity imparting agent, inorganic fine powders such as tin oxide, zinc oxide, carbon black, antimony oxide, titanium oxide, aluminum oxide and alumina may optionally be included therein. The inorganic fine powders may optionally be hydrophobized. Lubricants such as polytetrafluoroethylene, zinc stearate and polyvinylidenefluoride; abrasives such as cesium oxide, silicon carbonate and strontium titanate; caking inhibitors; and developability improvers such as white and black particulate materials having polarities reverse to that of a toner can also be used in a small amount.

The additives preferably treated with various agents such as silicone varnishes, various modified silicone varnishes, silicone oils, various modified silicone oils, silane coupling agents, silane coupling agents having functional groups and other organic silicon compounds for the purpose of controlling the charge amount of the resultant toner.

A developer can be prepared by the following method. The inorganic particulate materials such as a hydrophobic silica fine powder may be added to a developer to increase the storage stability, developability and transferability thereof. A typical powder mixer is used to mix external additives, and preferably includes a jacket and is capable of controlling inner temperature. The external additive may gradually be added in the mixer or on the way of mixing to change the history of stressing the external additive. As a matter of course, the number of rotations, rotation speed, mixing time and mixing temperature of the mixer may be changed. A large stress may be applied to the external additive at the beginning, and comparatively a small stress is applied thereto then, or vice versa. Specific examples of the mixers include V-type Mixer, Rocking Mixer, Loedge Mixer, Nauter Mixer and Henschel Mixer.

In order to control the shape of a toner, after toner constituents such as a binder resin and a colorant are melted and kneaded upon application of heat, cooled and pulverized, the shape of the toner is mechanically controlled by Hybridizer or Machanofusion. Alternatively, the toner constituents are dissolved and dispersed in a solvent capable of dissolving the binder resin, and the solvent is removed from the dispersion by a spray drier to prepare a spherical toner. A spherical toner can also be prepared by being heated in an aqueous medium.

Inorganic particulate materials can externally be added to the toner of the present invention to supplement the chargeability thereof. Specific examples of the inorganic particulate material include silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, etc.

The inorganic particulate material preferably has a primary particle diameter of from 5 nm to 2 μm, and more preferably from 5 to 500 nm. The inorganic particulate material preferably has a specific surface area of from 20 to 500 m²/g when measured by a BET nitrogen absorption method. The inorganic particulate material is preferably included in a toner in an amount of from 0.01 to 5% by weight, and more preferably from 0.01 to 2.0% by weight based on total weight of the toner.

Besides, polymer particulate materials, e.g., polystyrene, ester methacrylate and ester acrylate copolymers formed by soap-free emulsifying polymerization, suspension polymerization and dispersion polymerization; polycondensed particulate materials such as silicone, benzoguanamine and nylon; and polymerized particulate materials formed of thermosetting resins can also be used.

The external additives can be treated with a surface treatment agent to increase the hydrophobicity to prevent deterioration of fluidity and chargeability even in an environment of high humidity. Specific examples of the surface treatment agent include a silane coupling agent, a sililating agent, a silane coupling agent having an alkyl fluoride group, an organic titanate coupling agent, an aluminum coupling agent a silicone oil and a modified silicone oil.

The toner of the present invention may include a cleanability improver for removing a developer remaining on a photoreceptor and a first transfer medium after transferred. Specific examples of the cleanability improver include fatty acid metallic salts such as zinc stearate, calcium stearate and stearic acid; and polymer particulate materials prepared by a soap-free emulsifying polymerization method such as a polymethylmethacrylate particulate material and a polystyrene particulate material. The polymer particulate materials comparatively have a narrow particle diameter distribution and preferably have a volume-average particle diameter of from 0.01 to 1 μm.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Example 1

Preparation of Colorant Dispersion

First, a carbon black dispersion was prepared.

Seventeen (17) parts of carbon black (Regal 1400 from Cabot Corp.), 3 parts of a pigment dispersant (AJISPER PB821 from Ajinomoto Fine-Techno Co., Inc.) and 80 parts of ethylacetate were primarily dispersed by a mixer having an agitation blade to prepare a primary dispersion. The primary dispersion was more dispersed with higher shearing strength by a beads mill (LMZ type from Ashizawa Finetech Ltd. using zirconia beads having a diameter of 0.3 mm) to prepare a secondary dispersion completely free from aggregates having a size not less than 5 μm.

Preparation of Wax Dispersion

Next, a wax dispersion was prepared.

(Eighteen) 18 parts of carnauba wax, 2 parts of a wax dispersant and 80 parts of ethylacetate were primarily dispersed by a mixer having an agitation blade to prepare a primary dispersion to prepare a primary dispersion. After the primary dispersion was heated to have a temperature of 80° C. while agitated to dissolve the carnauba wax, the dispersion was cooled to have a room temperature and wax particles having a maximum diameter not greater than 3 μm were precipitated. The primary dispersion was more dispersed with higher shearing strength by a beads mill (LMZ type from Ashizawa Finetech Ltd. using zirconia beads having a diameter of 0.3 mm) such that the wax particles have a maximum diameter not greater than 1 μm.

Preparation of Solution of Dispersion

Next, a toner component liquid having the following formula and including a binder resin, the colorant dispersion and the wax dispersion was prepared.

One hundred (100) parts of a polyester resin, each 30 parts of the colorant dispersion and the wax dispersion, and 840 parts of ethylacetate were agitated for 10 min to be uniformly dispersed by a mixer having an agitation blade to prepare a dispersion. The pigment and wax did not aggregate with the solvent.

Preparation of Toner

A toner was prepared by the toner preparation apparatus using the droplet discharge head 11 in FIG. 2.

The toner component liquid 14 was fed to the droplet discharge unit of the liquid feed unit in FIG. 1 after dehydrated while the liquid pressure is controlled. Then, the deaerator had a pressure of −90 kPa and the circulation pathway had a flow rate of 200 ml/min. The toner component liquid is circulated in the circulation pathway for 30 min, dehydrated by the deaerator, reserved in a temporary reservoir and fed to the head unit. An amount of dissolved oxygen of the toner component liquid in the feed pathway to the head unit was 2.9 mg/l when measured by a dissolved oxygen analyzer (B506 for organic solvents from Iijima Electronics Corporation). The amount of dissolved oxygen is an index representing an amount of dissolved gas remaining in a liquid, and the less, the less the dissolved gas. In the present invention, the less the dissolved oxygen, the less microscopic bubbles in the head to stabilize discharging, and the amount of dissolved oxygen is preferably not greater than 3 mg/l and more preferably not greater than 2 mg/l.

The liquid-column resonance liquid chamber 18 had a length L between both ends in a longitudinal direction of 1.85 mm, the resonance mode was N=2, and the first to fourth discharge holes were located at an abdominal area of the N=2 mode pressure standing wave. The discharge hole 19 had an opening diameter of 10.0 μm and a round cross-sectional shape as FIG. 4A shows. Function generator WF1973 from NF Corp. was used as a drive signal generator and connected with the oscillator with a polyethylene-coated lead wire. The drive frequency was 330 kHz equivalent to the liquid resonance frequency. An input signal was a sine wave peak value of 12.0 V of applied voltage. The droplet was discharged at 14 m/s when photographed to determine the velocity.

The dry and collection chamber for toner in FIG. 1 is a vertically-fixed cylinder having an inner diameter of 300 mm and a height of 2,000 mm, and has narrowed upper end and lower end. The upper end includes the droplet discharger and a carrier airstream flow pathway. The toner collector 62 is located at the lower end. The carrier airstream flow pathway has a width of 80 mm, a height of 30 mm and rectangular section length of 200 mm, and the droplet discharger was horizontally located at a position of 50 mm from the airstream flowing in side. The droplet discharge direction and the airstream direction are nearly perpendicular to each other. The carrier airstream velocity was 20 m/s to avoid union of the droplets.

The toner component liquid was discharged by the toner preparation apparatus, dried and solidified in the chamber in FIG. 1 to prepare toner particles, and the toner particles were collected by the toner collector 62.

The toner particles were continuously prepared for 1 hr, but the liquid did not exude from the discharge hole or discharge did not stop.

The particle diameter distribution of the toner particles was measured by flow type particle image analyzer FPIA-3000 from Sysmex Corp. under the following conditions for 3 times. The toner particles had a weight-average particle diameter (Dv) of 5.6 μm, a number-average particle diameter (Dn) of 5.3 μm. An average of Dv/Dn was 1.06.

A few drops a nonion surfactant (preferably Contaminon from Wako Pure Chemical Industries, Ltd.) are added to 10 ml of water which is filtered such that a microscopic dust is removed therefrom to include 20 or less of particles in a measurement range, e.g., having a circle-equivalent diameter of from 0.60 to less than 159.21 μm in a volume of $10^{-3}$ cm$^3$ to prepare a mixture. Further, 5 mg of a sample are added thereto and the mixture is dispersed by an ultrasonic disperser UH-50 from STM Corp. at 20 kHz, 50 W/10 cm$^3$ for 1 min to prepare a dispersion. The dispersion is further dispersed for totally 5 min to include the particles having a circle-equivalent diameter of from 0.60 to less than 159.21 μm in an amount of 4,000 to 8,000/10$^{-3}$ cm$^3$ and the particle diameter distribution thereof was measured.

The sample dispersion is passed through a flow pathway (expanding along the flowing direction) of a flat and transparent flow cell (having a thickness of 200 μm). A strobe light and a CCD camera are located facing each other across the flow cell to form a light path passing across the thickness of the flow cell. While the sample dispersion flows, strobe light is irradiated to the particles at an interval of 1/30 sec to obtain images thereof flowing on the flow cell, and therefore a two-dimensional image of each particle having a specific scope parallel to the flow cell is photographed. From the two-dimensional image, the diameter of a circle having the same area is determined as a circle-equivalent diameter.

The circle-equivalent diameters of 1,200 or more of the particles can be measured and a ratio (% by number) of the particles having a specified circle-equivalent diameter can be measured for about 1 min. Results (frequency % and accumulation %) can be obtained, dividing 0.06 to 400 μm into 226 channels (30 channel/octave). Actually, the particles having a circle-equivalent diameter of from 0.60 to less than 159.21 μm are measured.

Comparative Example 1

The procedure for preparation of the toner in Example 1 was repeated except for removing the temporary reservoir and directly connect the liquid feed pathway to the droplet discharge unit.

Just after the discharge started, the liquid exuded from plural discharge holes, and a few minutes later, almost all discharge holes stopped discharging. Therefore, the toner particles were not collected.

A pressure applied to the discharge hole was not controlled and an excessive pressure was applied thereto, resulting in unstable discharge.

Evaluation results of the discharge stability and the toner average particle diameter distribution of Example 1 and Comparative Example 1 are shown in Table 1.

The liquid was continuously discharged for 60 min under the conditions in Table 1 and a ratio (%) of the number of the discharge holes still discharging was evaluated according to the following standards.

<Discharge Stability Evaluation Standard>
Excellent: 90% or more
Good: from 80% less than 90%
Fair: from 70% less than 80%
Poor: less than 70%

The particle diameter distribution (volume-average particle diameter/number-average particle diameter) of the collected toner was evaluated according to the following standards.

The toner particles were not collected in Comparative Example 1 and the particle diameter distribution was not measured.

<Particle Diameter Distribution Evaluation Standard>
Excellent: from 1.00 less than 1.07
Good: from 1.07 less than 1.12
Fair: from 1.12 less than 1.15
Poor: 1.15 or more

TABLE 1

| | Pressure control | Discharge stability | Average particle diameter distribution |
|---|---|---|---|
| Example 1 | With cylinder and piston | Excellent | Excellent |
| Comparative Example 1 | None | Poor | — |

Having now fully described the invention, it will be apparent to one of ordinary skill in the art that many changes and modifications can be made thereto without departing from the spirit and scope of the invention as set forth therein.

What is claimed is:

1. A particulate production apparatus, comprising:
   a droplet discharger configured to discharge a liquid comprising a particulate element which is solidified to become a particulate; and
   a pressure controller configured to feed the liquid comprising a particulate element to the droplet discharger at a pressure within a desired range,
   further comprising a temporary reservoir configured to connect with the droplet discharger and temporarily reserve the liquid comprising a particulate element,
   wherein the temporary reservoir comprises a capacity-variable sealed container, and the pressure controller controls a capacity of the sealed container to feed the liquid comprising a particulate element temporarily reserved in the sealed container to the droplet discharger at a pressure within a desired range.

2. A particulate production apparatus, comprising:
   a droplet discharger configured to discharge a liquid comprising a particulate element which is solidified to become a particulate; and
   a pressure controller configured to feed the liquid comprising a particulate element to the droplet discharger at a pressure within a desired range,
   further comprising a temporary reservoir configured to connect with the droplet discharger and temporarily reserve the liquid comprising a particulate element,
   wherein the temporary reservoir comprises a capacity-variable sealed container, and the pressure controller controls a capacity of the sealed container to feed the liquid comprising a particulate element temporarily reserved in the sealed container to the droplet discharger at a pressure within a desired range, wherein the sealed container comprises:
- a cylinder configured to contain the liquid comprising a particulate element; and
- a piston configured to press the liquid comprising a particulate element contained in the cylinder.

3. The particulate production apparatus of claim 1, further comprising a deaerator configured to deaerate a gas dissolved in the liquid comprising a particulate element fed to the droplet discharger.

4. The particulate production apparatus of claim 1, wherein the droplet discharger comprises a liquid-column resonance liquid chamber comprising a discharge hole and oscillates the liquid comprising a particulate element in the liquid-column resonance liquid chamber to form a standing wave by liquid-column resonance, and wherein the discharge hole is formed at an abdominal area of the standing wave.

5. The particulate production apparatus of claim 1, wherein the particulate is a toner.

6. A particulate production method, comprising:

discharging a liquid comprising a particulate element by a droplet discharger to form a droplet; and solidifying the droplet to form a particulate, wherein the liquid comprising a particulate element is fed to the droplet discharger at a pressure with a desired range.

7. The particulate production method of claim 6, wherein the droplet discharger comprises a liquid-column resonance liquid chamber comprising a discharge hole and oscillates the liquid comprising a particulate element in the liquid-column resonance liquid chamber to form a standing wave by liquid-column resonance, and wherein the discharge hole is formed at an abdominal area of the standing wave.

8. The particulate production method of claim 6, wherein the particulate is a toner.

* * * * *